F. E. GOLDSMITH.
TILE MEASURING MACHINE.
APPLICATION FILED OCT. 17, 1911.

1,207,161.

Patented Dec. 5, 1916.
6 SHEETS—SHEET 1.

WITNESSES
C. K. Davies
L. B. Aveilhé

INVENTOR
F. E. Goldsmith
by Brock Bebaw
Attorney

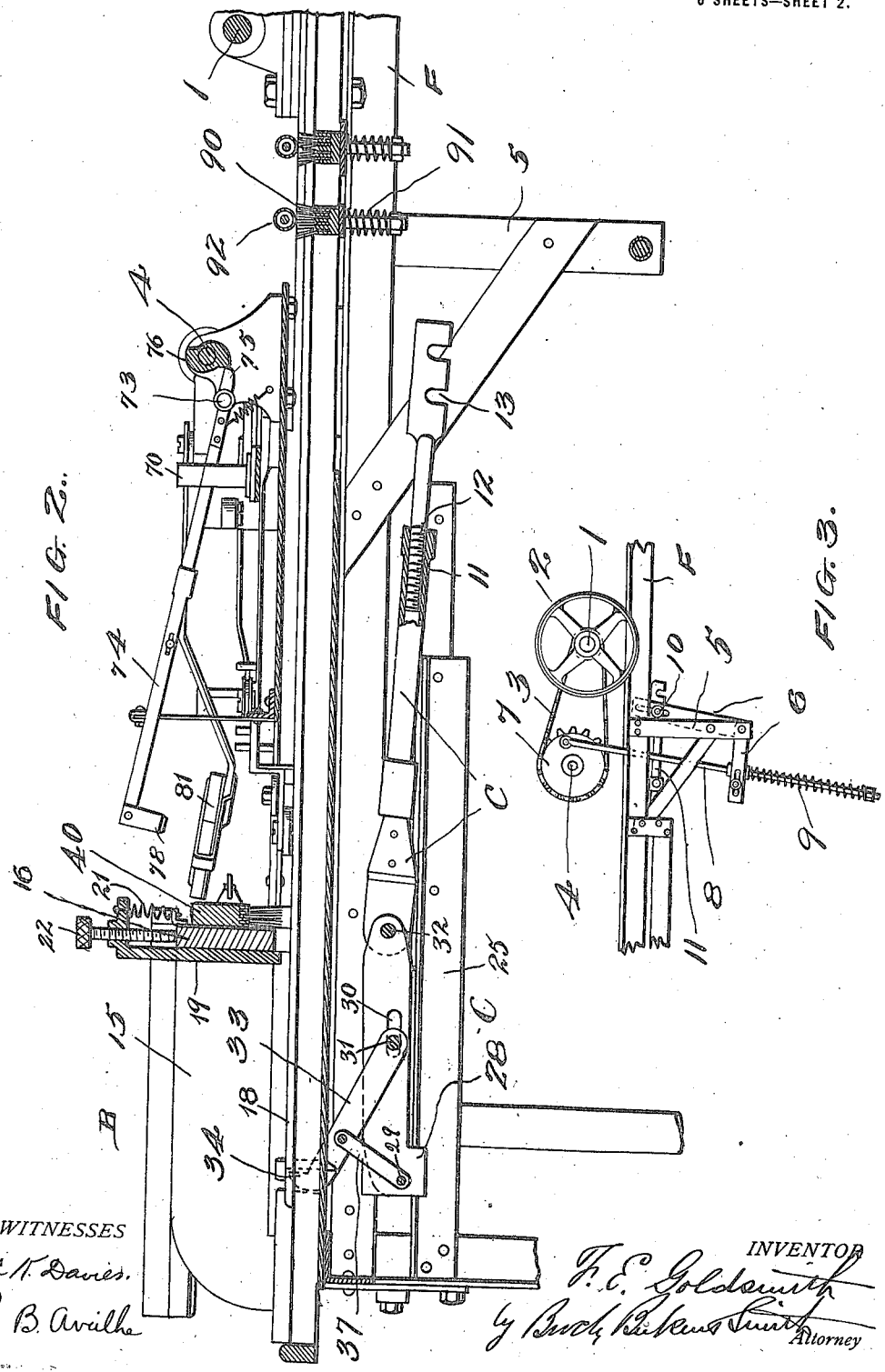

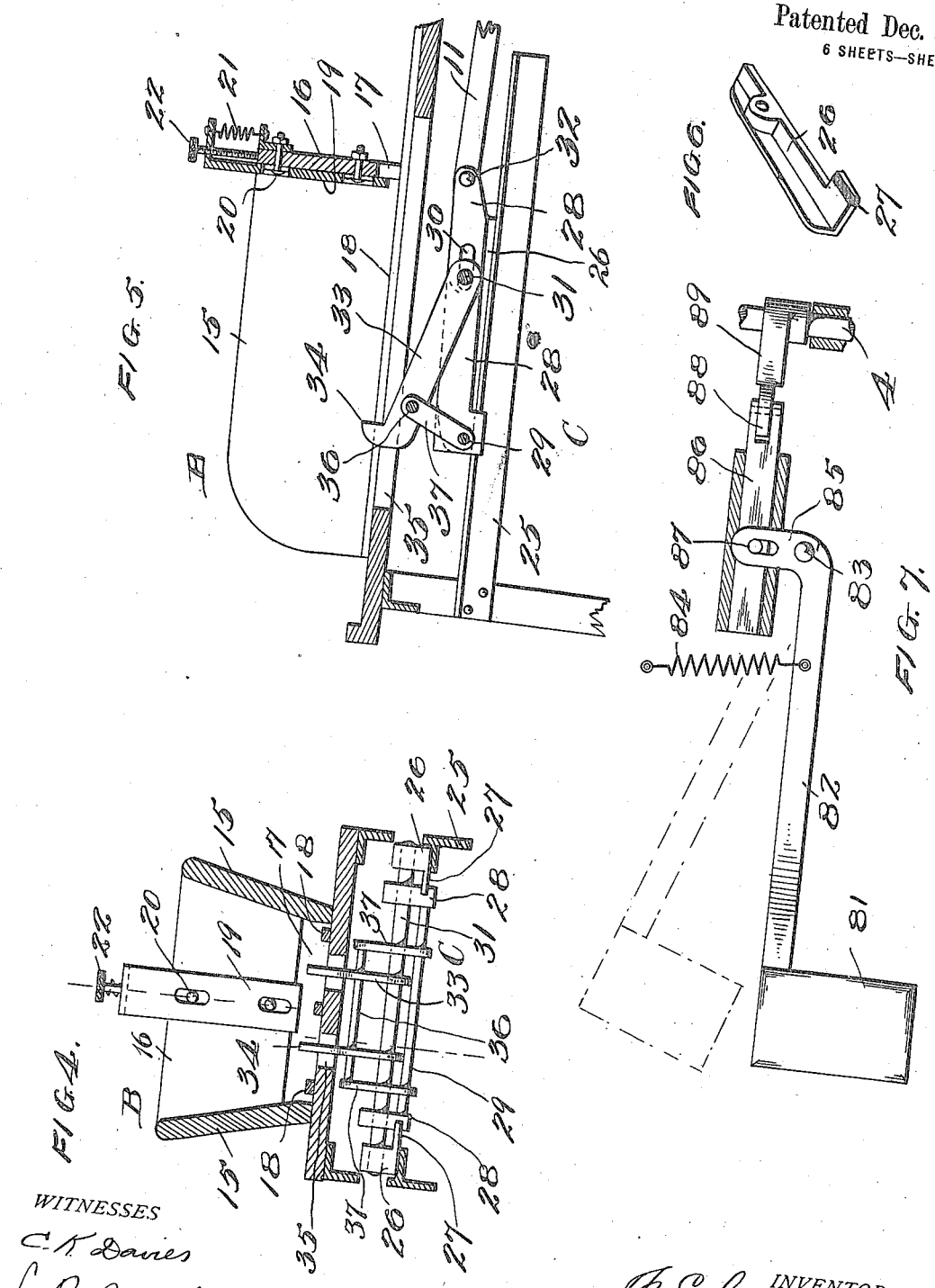

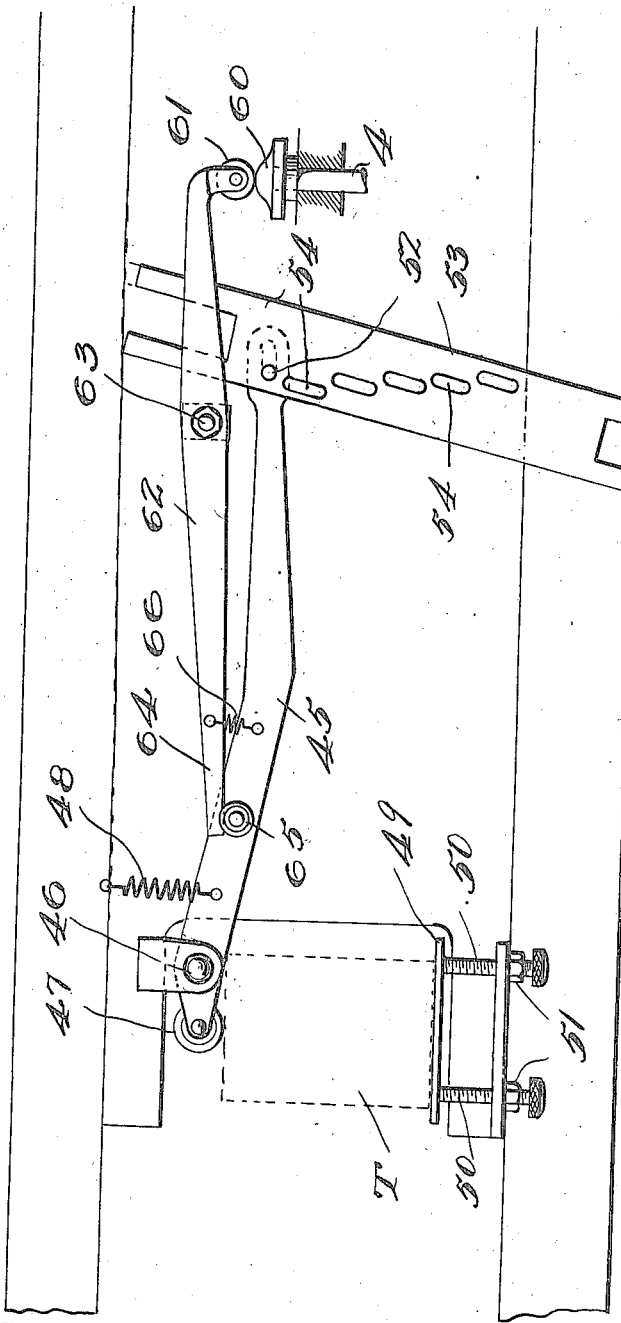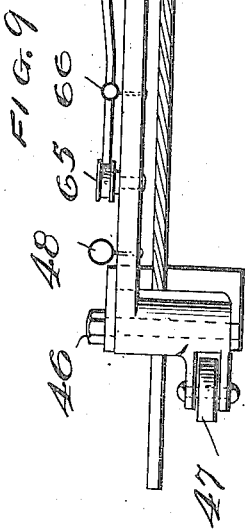

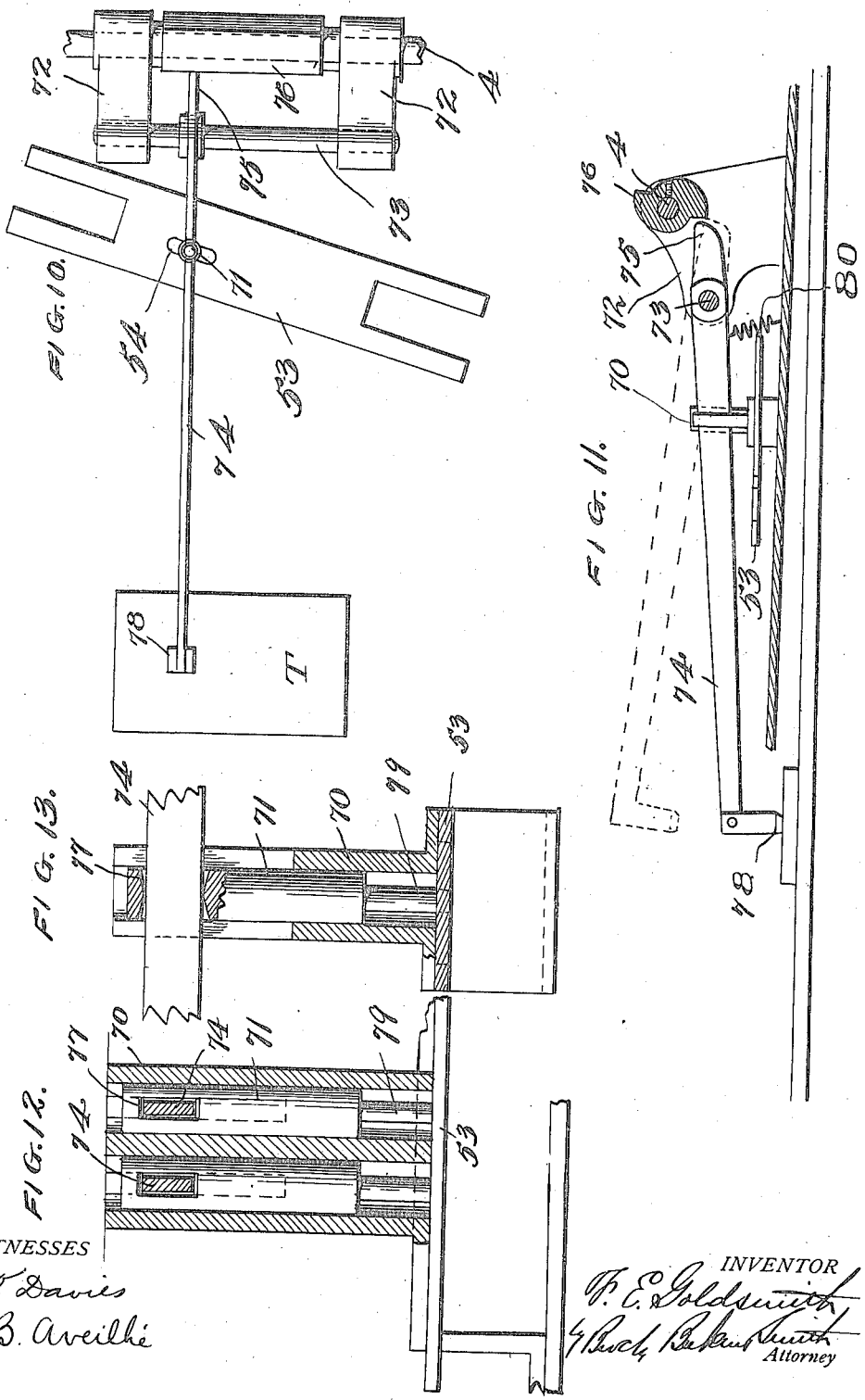

F. E. GOLDSMITH.
TILE MEASURING MACHINE.
APPLICATION FILED OCT. 17, 1911.

1,207,161.

Patented Dec. 5, 1916.
6 SHEETS—SHEET 6.

WITNESSES
C. K. Davies.
J. L. Drummond.

INVENTOR
F. E. Goldsmith
Attorney

UNITED STATES PATENT OFFICE.

FREDERICK ERNST GOLDSMITH, OF HAMILTON, OHIO, ASSIGNOR TO CERAMIC MACHINERY COMPANY, OF HAMILTON, OHIO, A CORPORATION OF OHIO.

TILE-MEASURING MACHINE.

1,207,161.   Specification of Letters Patent.   Patented Dec. 5, 1916.

Application filed October 17, 1911. Serial No. 655,159.

*To all whom it may concern:*

Be it known that I, FREDERICK E. GOLDSMITH, a citizen of the United States, and a resident of Hamilton, in the State of Ohio, have invented a certain new and useful Tile-Measuring Machine, of which the following is a specification.

The invention is designated for convenience, a tile measuring machine, but it is to be understood that it is capable of adaptation for measuring other objects more or less similar to tiles and that modifications may be made within the spirit of the invention to adapt it to different uses.

The invention also includes means for stamping characters upon the tiles in accordance with their measurements.

In the particular embodiment of the invention described herein, the tiles are measured for length or width, but many of the particular mechanisms employed may be adapted with slight changes to measuring for thickness or for warpage and for stamping characters upon the tiles in accordance with such measurements.

Broadly described, the machine comprises a receptacle or feed box, feeding mechanism for forwarding the tiles one at a time from a group in the box to the measuring device, a measuring device, and stamping or printing mechanism actuated in connection with the measuring device for imprinting designating characters upon the tiles. Preferably the machine is entirely automatic so that when a group of tiles is deposited in the box they are fed forward one at a time and measured, properly stamped and delivered without intervention by the attendant.

I will now describe in detail, in connection with the accompanyng drawing, one exemplifying structure in which the invention is embodied.

Figure 1:
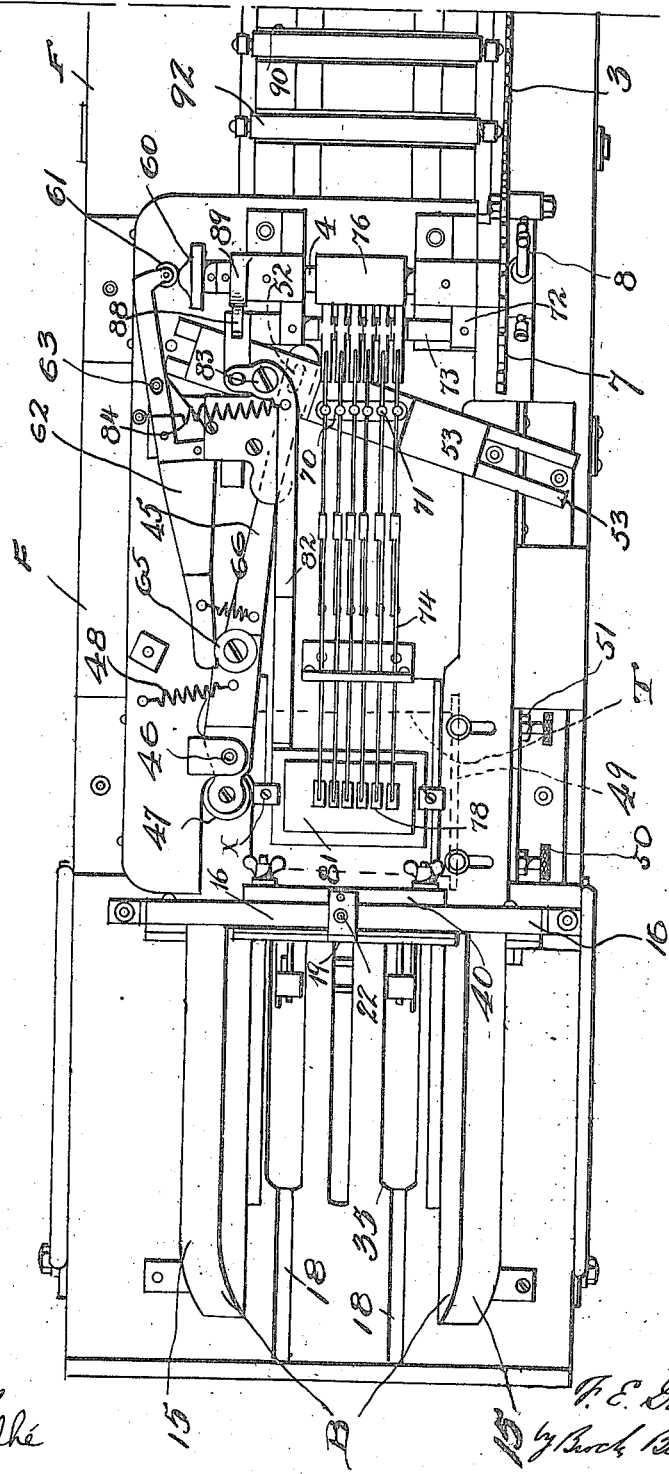
Figure 14:
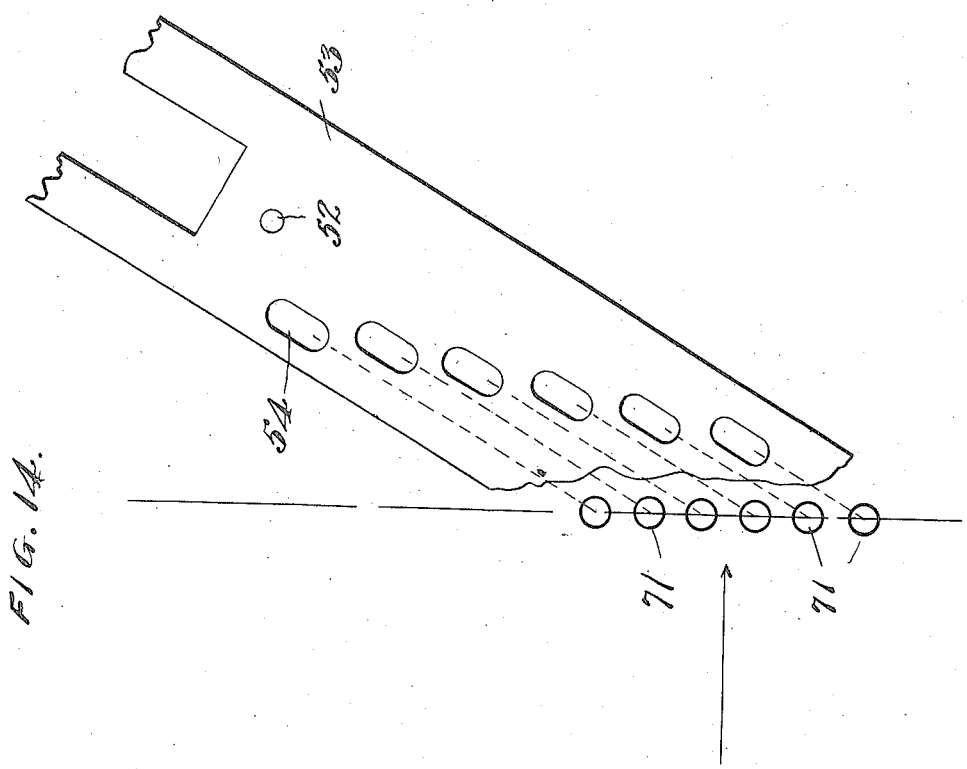

Figure 1 is a plan view of the machine. Fig. 2 is a longitudinal section. Fig. 3 is a detail of part of the drive for the feeding machine. Fig. 4 is a vertical section through the feed box looking from the rear. Fig. 5 is a vertical longitudinal section of the feed box. Fig. 6 is a perspective detail of part of the feeding mechanism. Fig. 7 is a plan of the inking mechanism. Fig. 8 is a plan of the measuring device and type controlling slide. Fig. 9 is a side elevation of the same. Fig. 10 is a plan of the printing mechanism, the inking mechanism being omitted and only one type bar being shown for the sake of clearness. Fig. 11 is a side elevation of the same. Fig. 12 is a transverse section through two of the type plungers. Fig. 13 is a longitudinal section through one of the plungers and its housing. Fig. 14 is a plan view of the printing slide 53 in proper relation to the type plungers to show how the latter are permitted to operate one at a time according to the position of the printing slide.

Referring first to Figs. 1 and 2, F is the frame, and B designates, as a whole, the feed box mounted at the rear end thereof. For convenience the feed box end is designated as the rear of the machine, because the tiles are understood to be fed forward from that point to the opposite end of the machine which is designated as the forward or front end.

C designates, in general, the feeding mechanism, most of which is located below the bed of the machine.

The measuring and printing mechanisms are shown collectively in detail views but not identified in the assembled views except by specific reference characters.

Toward the front of the machine, as shown in Figs. 2 and 3, is a drive shaft 1, provided with driving pulley 2. This shaft is connected by sprockets and chain 3 with cam shaft 4. Depending from the frame, as shown in Fig. 3, is a bracket 5 supporting bell crank 6 of which the horizontal arm is connected with large sprocket 7 on the cam shaft by pitman 8. The connection between the pitman and the bell crank is preferably by means of a spring 9 so that a yielding drive for the feeding mechanism is afforded. The vertical arm of the bell crank is connected by means of a stud 10 with an adjustable pitman 11. Adjustment may be made by means of a telescoping joint, as at 12, or by means of a plurality of notches 13 adapted to fit stud 10 or, in some cases, both of these adjustments may be provided. As the cam shaft revolves pitman 8 is moved up and down, bell crank 6 is oscillated and pitman 11 is thus given a fore and aft motion necessary for the feeding which will now be described in connection with the feed box.

The feed box (Figs. 1, 2, 4 and 5) consists of two downwardly convergent sides 15, open toward the rear, and a front piece 16 which terminates somewhat above the bottom of the box leaving an opening 17 for the passage of a single tile. At the bottom of the box are provided longitudinal strips 18 on which the tiles are supported. The end piece 16 is provided with an adjustable gate 19 movably secured to the end piece by means of slots and bolts 20. The gate is urged downward by spring 21 and its motion in that direction is limited by an adjustable screw 22. This gate fixes the effective height of opening 17 and by yielding upward, prevents injury to the tiles or the machine in case of jamming. Below the bed the frame is provided with guideways 25 and on these reciprocate slides 26 (see Figs. 4, 5 and 6). These slides are provided with inwardly projecting flanges 27 fitting in grooves in blocks 28 as seen in Fig. 4. Blocks 28 are transversely connected by a bar 29. The blocks are also provided with slots 30 and through these slots passes a bar 31 which serves to connect the slides 26. The blocks 28 are also connected at their forward ends by a bar 32 and to this bar is positively connected the pitman 11. On the bar 31 are pivoted the long arms 33 of hooks 34 which extend up through longitudinal slots 35 in the bed. The rear ends of the hooks are connected by rod 36 and this rod is connected with bar 29 by links 37.

Tiles are placed in the box B in stacks, resting on strips 18. During a half revolution of cam shaft 4 pitman 11 is moved to the rear and then, on further rotation of the cam shaft, starts forward again, whereupon the parts assume the position shown in Fig. 5. At the beginning of the forward movement of the pitman blocks 28 move forward. The slides 26, however, by engagement with guides 25 resist forward motion and consequently, the blocks 28 move forward in relation to the slides, this being permitted by the slots 30 freely engaging the bar 31 in respect to forward and backward movement. The described forward movement of blocks 28 in relation to slides 26 causes links 37 to approach as nearly as possible to a vertical position, as shown in Fig. 5, thus elevating hooks 34 which are now in position to engage the rear end of the bottom tile in the stack. Further rotation of the cam shaft pulls forward blocks 28 and slides 26, which now can have no further relative movement, also hooks 34; and the lower tile is shoved forward under gate 19 and into position for action by the measuring device. This completes one rotation of the cam shaft. At the commencement of the next rotation blocks 28 move rearward in relation to slides 26 and in an obvious manner, through links 37, the hooks 34 are thus drawn downward below the level of strips 18. The stack of tiles has dropped downward and a new tile rests upon the strips. Completion of a half rotation of the cam shaft brings the slides, blocks and hooks back to the rear end of the machine (as shown in Fig. 2) without engagement with the tiles and commencement of the next half rotation of the shaft again elevates the hooks and moves them forward, and so on.

Just forward of the opening 17 and usually secured against end piece 16, is a brush 40 (Figs. 1 and 2) which brushes the upper faces of the tiles as they pass through the opening. It is to be understood that tiles are usually measured after they are glazed and therefore the glazed faces are usually arranged downward and the upper faces, according to this arrangement, are unglazed and therefore adapted to receive the designating imprint. In cases where, for any reason, it is desirable to arrange the glazed faces of the tiles upward the printing mechanism can be arranged to operate from the bottom of the machine so as to print upon the unglazed faces.

Each of the described feeding actions moves a tile T forward to the position shown in Fig. 1, the said tile pushing forward the last measured tile. The newly placed tile is now to be measured and stamped as follows: The measuring device is shown in its essentials in Figs. 8 and 9 in which the dotted lines show a tile in measuring position. Measuring lever 45 is pivoted at 46 and provided with a roller 47 to engage the tile. Spring 48 pulls the lever and so through the roller urges the tile against an adjustable stop 49 which forms the other side of the measuring couple. A typical adjustment for the stop, as shown, consists of set screws 50 engaging the stop and lock nuts 51. The long end of the lever 45 is connected by a pin and slot connection 52 to printing slide 53 which is mounted on suitable guides to move substantially transversely of the bed. This slide, by the action of the lever 45, takes a position corresponding to the width or length of the tile and, broadly considered, this slide is therefore an indicating device from which, by noting its position, the length of the particular tile may be determined and the tile disposed of accordingly. But in a preferred adaptation the slide 53 is employed to control the action of printing mechanism which will print upon the tile a designation corresponding to its particular dimension. For this purpose the slide is provided with holes or slots 54, each corresponding to a particular type as will appear. The roller arm of lever 45 is very short and the slide arm is relatively very long so that the slight difference in length or width occurring in tiles is properly amplified to enable the machine to functionate easily and properly. To actuate lever 45 the cam shaft is provided, conveniently at one end, with a cam 60

(Figs. 1, 8 and 9). This engages a follower 61 on actuating lever 62 fixedly pivoted at 63. The free end 64 of the lever engages lever 45 by means of a roller or stud 65. The two levers may be urged into engagement by a spring 66. Cam 60 is placed on shaft 4 so that when the tile is being forwarded to measuring position follower 61 is upon the high part of the cam. The rotation of the cam shaft has, by the action of the cam, moved the actuating lever 62 so that measuring roller 47 has been moved away from stop 49. The tile, having been placed, further rotation of the cam shaft 4 frees follower 61 from the high part of the cam and thereupon spring 48 moves measuring lever 45 so that roller 47 promptly engages the tile and holds it against the stop 49. Printing slide 53 thereupon takes the position corresponding to the position of the lever and a corresponding type is caused to strike and mark the tile as will be described. Further rotation of the cam shaft now again moves the cam lever 62 so that the measuring roller 47 is freed from the tile; the tile is moved forward; another tile is fed into position and measured, and so on.

Above the printing slide 53 is arranged transversely of the machine, a housing 70 (Figs. 1, 11, 12 and 13) in which are mounted a plurality of plungers 71, one for each type. Adjacent to the cam shaft is a bracket 72 supporting a pivot shaft 73 for the type bars 74. The free ends 75 of the type bars engage under the two-lobed cam 76 fixed on the cam shaft. The long arms of the type bars extend each through a slot 77 in the corresponding plunger and at the forward end each bar carries a type 78 arranged to strike the tile when the latter is in measuring position. The bottom ends 79 of the plungers rest above the printing slide 53. The type bars tend to move downward at the type ends by gravity and by the pull of springs 80. The type are inked by means of a pad 81 (see also Fig. 2) which is swung under the type when they are lifted. The type are then dropped upon the pad and again raised, the pad is swung aside, the type are dropped again toward the tile, and one of them prints upon the tile according to the position of the printing slide; the type are then raised; the tile is moved forward and a new one is placed; the type are again inked and so on. These movements will be more particularly explained. The pad 81 (see especially Figs. 1 and 7) is carried on the long end of lever 82 pivoted at 83 and retracted by a spring 84. The short arm 85 of the lever is arranged at a right angle to the long arm and engages a reciprocating plunger 86 by means of a pin and slot connection 87. Plunger 86 carries a roller engaging a cam 89 on the cam shaft. This cam has a single lobe. Cam 89 is arranged on the shaft so that when one of the lobes of type cam 76 is in engagement with the short ends of the type bars, the lobe of cam 89 actuates plunger 86 and swings the type pad 81 under against the pull of spring 84. The lobe of cam 89 is of sufficient arc to maintain the pad in active position during a part of the rotation of shaft 4 until the type bars are free from the just-engaging lobe of cam 76. The type, thereupon, all drop upon the pad, this being permitted without regard to the position of printing slide 53 because the inking pad is at a much greater elevation than the tile and in this partial descending movement of the type it is not necessary for the ends 79 of the plungers 71 to pass through the printing slide. By further rotation of the cam shaft, the next lobe of cam 76 then raises the type; shortly afterward cam follower 88 is released by cam 89; the inking pad is retracted by its spring; further rotation of cam 76 then releases the short ends of the type bars from the just-engaging lobe of the cam, and the type then drop until the ends of all but one of the plungers 71 engage the printing slide 53. This engagement supports all but one of the type out of engagement with the tile. One of the plungers, however, passes through slot 54 of the printing slide and the corresponding type drops upon the tile and prints upon it the proper designating character. Further rotation of cam 76 again retracts all the type; the tile is fed forward; the inking pad is moved to active position and so on.

As the tiles move forward from the printing mechanism they pass over brushes 90 (Figs. 1 and 2), which are urged upwardly by springs 91 into engagement with the tiles whereby their lower faces are brushed. The tiles are then usually delivered to a table where they are assorted according to the designations stamped upon them.

I claim:—

1. In a machine for measuring tiles and similar objects, the combination of a cam shaft, driving means, a feed box, feeding hooks thereunder, means operated by said shaft for reciprocating said hooks to feed tiles successively from said box to measuring position, a measuring lever having a tile engaging part, a cam on said shaft for bringing said lever in measuring engagement with each tile when in measuring position, printing devices, a cam on said shaft for moving said devices toward and from the tile, and a controlling slide to restrain the movement of one of said printing devices, said slide being connected with and operated by said lever.

2. In a machine for measuring tiles and similar objects, the combination of a feed box, intermittent feeding means for forwarding objects from the box, a measuring device, means for moving the measuring device into measuring contact with the objects when they are in stationary position, means controlled by said measuring device for imprinting a character upon the object, said means including printing type, and means for inking the type when they are retracted from the object.

3. In a machine for measuring tiles and the like, the combination of a stationary measuring member, a movable measuring member normally in retracted position, a feed box, means for forwarding tiles intermittently from the feed box and passing them between said measuring members, and means for moving the movable member against the tiles for measuring while they are stationary, printing means comprising a plurality of distinctive characters to be placed upon the tiles to indicate measurement thereof and selective means actuated by the movable measuring device to effect the actuation of said printing means so that a single distinctive printing character will be impressed upon each tile to indicate its measurement.

4. In a machine for measuring tiles and the like, the combination of an adjustable stationary measuring member, a movable measuring member normally retracted from the path of the tiles, a feed box, means for forwarding tiles intermittently from the feed box and passing them between said measuring members, and means for yieldingly moving the movable member against the tiles to effect measuring while they are stationary, printing means comprising a plurality of distinctive characters to be placed upon the tiles to indicate measurement thereof and selective means actuated by the movable measuring device to effect the actuation of said printing means so that a single distinctive printing character will be impressed upon each tile to indicate its measurement.

5. In a machine for measuring tiles and the like, the combination of a feed box, a fixed measuring member, a normally retracted movable measuring member in opposition thereto, intermittent feeding means for forwarding tiles from the box between said measuring members, and means for urging the movable member against the tiles for measuring when they are stationary between said measuring members, printing means comprising a plurality of distinctive characters to be placed upon the tiles to indicate measurement thereof and selective means actuated by the movable measuring device to effect the actuation of said printing means so that a single distinctive printing character will be impressed upon each tile to indicate its measurement.

6. In a machine for measuring tiles and the like, the combination of a feed box, an adjustable fixed measuring member, a movable, normally retracted, measuring member in opposition thereto, intermittent feeding means for forwarding tiles from the box between said measuring members, and means for urging the movable member against the tiles for measuring when they are stationary between said measuring members, printing means comprising a plurality of distinctive characters to be placed upon the tiles to indicate measurement thereof and selective means actuated by the movable measuring device to effect the actuation of said printing means so that a single distinctive printing character will be impressed upon each tile to indicate its measurement.

7. In a machine for measuring tiles and the like, the combination of feeding means, a measuring device, a plurality of types, means for raising the types and dropping them toward a tile for printing, and a selective type controller actuated by the measuring device and serving to permit only the type corresponding to the momentary position of the measuring device to print, and driving means for operating said feeding means, measuring device and type-operating means in predetermined relationship.

8. In a machine for measuring tiles and the like, the combination of intermittent feeding means, a measuring device, a plurality of types, means for advancing and retracting them, a printing controller moving angularly to the line of types and provided with a plurality of perforations, said controller being operatively connected with said measuring device, and means intermediate the types and the controller whereby only a single type is permitted to print.

9. In a machine for measuring tiles and the like, the combination of intermittent feeding means, a measuring device, a plurality of type bars, types thereon, plungers carried by the bars, a controller plate angularly movable in relation to the plungers and provided with perforations to selectively permit only a single plunger to pass through the plate at one time, means for raising and dropping the type bars, and a connection between the measuring device and the controller.

FREDERICK ERNST GOLDSMITH.

Witnesses:
GEORGE R. PHELAN,
CHARLES A. JOHNSON.